United States Patent
Cho et al.

(10) Patent No.: US 8,049,776 B2
(45) Date of Patent: *Nov. 1, 2011

(54) THREE-DIMENSIONAL CAMCORDER

(75) Inventors: Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 1476 days.

This patent is subject to a terminal disclaimer.

(21) Appl. No.: 11/419,480

(22) Filed: May 19, 2006

(65) Prior Publication Data

US 2006/0221179 A1    Oct. 5, 2006

Related U.S. Application Data

(63) Continuation-in-part of application No. 10/822,414, filed on Apr. 12, 2004, now Pat. No. 7,068,416, and a continuation-in-part of application No. 10/855,554, filed on May 27, 2004, now Pat. No. 6,970,284, and a continuation-in-part of application No. 10/855,715, filed on May 27, 2004, now Pat. No. 7,031,046, and a continuation-in-part of application No. 10/855,287, filed on May 27, 2004, now Pat. No. 6,934,072, and a continuation-in-part of application No. 10/857,796, filed on May 28, 2004, now Pat. No. 6,934,073, and a continuation-in-part of application No. 10/857,714, filed on May 28, 2004, now Pat. No. 7,161,729, and a continuation-in-part of application No. 10/857,280, filed on May 28, 2004, now Pat. No. 6,999,226, and a continuation-in-part of application No. 10/872,241, filed on Jun. 18, 2004, now Pat. No. 7,382,516, and a continuation-in-part of application No. 10/893,039, filed on Jul. 16, 2004, now Pat. No. 7,239,438, and a continuation-in-part of application No. 10/896,146, filed on Jul. 21, 2004, now Pat. No. 7,215,882, and a continuation-in-part of application No. 10/979,612, filed on Nov. 2, 2004, now Pat. No. 7,173,653, and a continuation-in-part of application No. 10/983,353, filed on Nov. 8, 2004, now Pat. No. 7,267,447, and a continuation-in-part of application No. 11/072,597, filed on Mar. 4, 2005, now Pat. No. 7,330,297, and a continuation-in-part of application No. 11/072,296, filed on Mar. 4, 2005, now abandoned, and a continuation-in-part of application No. 11/076,616, filed on Mar. 10, 2005, now Pat. No. 7,274,517, and a continuation-in-part of application No. 11/191,886, filed on Jul. 28, 2005, now Pat. No. 7,095,548, and a continuation-in-part of application No. 11/208,115, filed on Aug. 19, 2005, now abandoned, and a continuation-in-part of application No. 11/218,814, filed on Sep. 2, 2005, now abandoned, and a continuation-in-part of application No. 11/294,944, filed on Dec. 6, 2005, now Pat. No. 7,212,330, and a continuation-in-part of application No. 11/369,797, filed on Mar. 6, 2006, now Pat. No. 7,474,454, and a continuation-in-part of application No. 11/382,707, filed on May 11, 2006, now Pat. No. 7,742,232.

(51) Int. Cl.
*H04N 13/02* (2006.01)

(52) U.S. Cl. .......................................................... 348/49

(58) Field of Classification Search .................... 348/49, 348/143–169
See application file for complete search history.

(56) References Cited

U.S. PATENT DOCUMENTS 2,002,376  A    5/1935  Mannheimer
(Continued)

FOREIGN PATENT DOCUMENTS

JP    08-043881    2/1996
(Continued)

*Primary Examiner* — David Czekaj

(57) ABSTRACT

The present invention provides a three-dimensional camcorder comprising a three-dimensional imaging system acquiring the three-dimensional image information of an object and a three-dimensional viewfinder displaying three-dimensional image using at least one variable focal length micromirror array lens.

27 Claims, 9 Drawing Sheets

U.S. PATENT DOCUMENTS

| | | |
|---|---|---|
| 4,407,567 A | 10/1983 | Michelet |
| 4,834,512 A | 5/1989 | Austin |
| 5,004,319 A | 4/1991 | Smither |
| 5,212,555 A | 5/1993 | Stoltz |
| 5,369,433 A | 11/1994 | Baldwin |
| 5,402,407 A | 3/1995 | Eguchi |
| 5,467,121 A | 11/1995 | Allcock |
| 5,612,736 A | 3/1997 | Vogeley |
| 5,696,619 A | 12/1997 | Knipe |
| 5,881,034 A | 3/1999 | Mano |
| 5,897,195 A | 4/1999 | Choate |
| 5,986,811 A | 11/1999 | Wohlstadter |
| 6,025,951 A | 2/2000 | Swart |
| 6,028,689 A | 2/2000 | Michaliek |
| 6,064,423 A | 5/2000 | Geng |
| 6,084,843 A | 7/2000 | Abe |
| 6,104,425 A | 8/2000 | Kanno |
| 6,111,900 A | 8/2000 | Suzudo |
| 6,123,985 A | 9/2000 | Robinson |
| 6,282,213 B1 | 8/2001 | Gutin |
| 6,315,423 B1 | 11/2001 | Yu |
| 6,329,737 B1 | 12/2001 | Jerman et al. |
| 6,498,673 B1 | 12/2002 | Frigo |
| 6,507,366 B1 | 1/2003 | Lee |
| 6,549,730 B1 | 4/2003 | Hamada |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,784,771 B1 | 8/2004 | Fan |
| 6,833,938 B2 | 12/2004 | Nishioka |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,958,777 B1 | 10/2005 | Pine |
| 6,970,284 B1 | 11/2005 | Kim |
| 6,995,909 B1 | 2/2006 | Hayashi |
| 6,999,226 B2 | 2/2006 | Kim |
| 7,023,466 B2 | 4/2006 | Favalora |
| 7,031,046 B2 | 4/2006 | Kim |
| 7,039,267 B2 * | 5/2006 | Ducellier et al. ............... 385/17 |
| 7,046,447 B2 | 5/2006 | Raber |
| 7,068,416 B2 | 6/2006 | Gim |
| 7,077,523 B2 | 7/2006 | Seo |
| 7,161,729 B2 | 1/2007 | Kim |
| 2002/0018407 A1 | 2/2002 | Komoto |
| 2002/0102102 A1 | 8/2002 | Watanabe |
| 2002/0135673 A1 * | 9/2002 | Favalora et al. ............... 348/42 |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 * | 10/2003 | Moon et al. ................... 359/290 |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264870 A1 | 12/2005 | Kim |
| 2006/0012766 A1 | 1/2006 | Klosner |
| 2006/0012852 A1 | 1/2006 | Cho |
| 2006/0028709 A1 | 2/2006 | Cho |
| 2006/0187524 A1 | 8/2006 | Sandstrom |
| 2006/0209439 A1 | 9/2006 | Cho |

FOREIGN PATENT DOCUMENTS

| | | |
|---|---|---|
| JP | 11-069209 | 3/1999 |
| JP | 2002-288873 | 10/2002 |

* cited by examiner

Prior Arts

THREE-DIMENSIONAL CAMCORDER

REFERENCE TO RELATED APPLICATIONS

This application is a continuation-in-part of, and claims priority to U.S. patent application Ser. No. 10/822,414 filed Apr. 12, 2004, U.S. patent application Ser. No. 10/855,554 filed May 27, 2004, U.S. patent application Ser. No. 10/855,715 filed May 27, 2004, U.S. patent application Ser. No. 10/855,287 filed May 27, 2004, U.S. patent application Ser. No. 10/857,796 filed May 28, 2004, U.S. patent application Ser. No. 10/857,714 filed May 28, 2004, U.S. patent application Ser. No. 10/857,280 filed May 28, 2004, U.S. patent application Ser. No. 10/872,241 filed Jun. 18, 2004, U.S. patent application Ser. No. 10/893,039 filed Jul. 16, 2004, U.S. patent application Ser. No. 10/896,146 filed Jul. 21, 2004, U.S. patent application Ser. No. 10/979,612 filed Nov. 2, 2004, U.S. patent application Ser. No. 10/983,353 filed Nov. 8, 2004, U.S. patent application Ser. No. 11/072,597 filed Mar. 4, 2005, U.S. patent application Ser. No. 11/072,296 filed Mar. 04, 2005, U.S. patent application Ser. No. 11/076,616 filed Mar. 10, 2005, U.S. patent application Ser. No. 11/191,886 filed Jul. 28, 2005, U.S. patent application Ser. No. 11/208,115 filed Aug. 19, 2005, U.S. patent application Ser. No. 11/218,814 filed Sep. 02, 2005, U.S. patent application Ser. No. 11/294,944 filed Dec. 06, 2005, U.S. patent application Ser. No. 11/369,797 filed Mar. 06, 2006, and U.S. patent application Ser. No. 11/382,707 filed on May 11, 2006, all of which are hereby incorporated by reference.

FIELD OF INVENTION

The present invention relates generally to camcorder systems, and in particular, to a three-dimensional camcorder system.

BACKGROUND OF THE INVENTION

Camcorders (video camera recorders) receive video information and convert it to electronic video signal, which is recorded on the storage medium in analog or digital formats. While most conventional camcorders record and display two-dimensional video images, some camcorders are capable of recording particular information required for stereoscopic viewing. When human eyes see a scene, right and left side eyes have two different perspectives due to their separation. The brain fuses these two images and assesses the visual depth. Three-dimensional camcorders need to provide two perspective images for each video frame. In order to provide different viewing angles simultaneously, they usually use two cameras which are separated at a certain distance as human eyes are. FIG. 1 depicts the schematic illustration of a prior art using a pinhole or thin lens model. Cameras 11 and 12 have identical focal length and their image planes are coplanar in space. The distance between optical centers 13 and 14 is 2d. Two cameras have different perspectives for an object 15 and provide a pair of stereoscopic images, which allows three-dimensional viewing. However, these devices tend to be large and heavy, and come at huge cost due to multiple camera systems and their optical axis separation requirement.

Conventional three-dimensional display devices use two perspective images of a scene and provide methods to let each eye see an only intended perspective. While conventional three-dimensional display devices require special glasses for a viewer to see a three-dimensional image from two perspective images, autostereoscopic display devices do not require special glasses. Autostereoscopic devices display two different perspective images concurrently and use barriers to let each eye see the intended image as disclosed by U.S. Pat. No. 6,046,849 to Moseley. Usually, these devices have several viewing areas and the scene appears to leap out of the screen, which provides a virtual-reality environment. These autostereoscopic display devices can be built in the three-dimensional camcorders as electronic viewfinders like normal LCD screens in two-dimensional camcorders in order to find and focus views in the three-dimensional space and replay recorded three-dimensional images or movies.

SUMMARY OF THE INVENTION

The present invention provides a three-dimensional camcorder comprising at least one variable focal length Micro-Mirror Array Lens (MMAL) having a plurality of micromirrors for three-dimensional imaging, recording, and displaying.

An objective of the invention is to provide a three-dimensional camcorder that provides depthwise images and the depth information for each depthwise image, an all-in-focus image and the depth information for each pixel of the all-in-focus image, or a pair of stereoscopic images using a single camera system. The three-dimensional camcorder comprises at least one variable focal length MicroMirror Array Lens (MMAL), an imaging unit, and an image processing unit for three-dimensional imaging and recording, and a three-dimensional viewfinder for displaying three-dimensional images.

The variable focal length MMAL comprises a plurality of micromirrors, wherein each of the micromirrors in the MMAL is controlled to change the focal length of the MMAL. Each micromirror has the same function as a mirror. Micromirrors in the MMAL are arranged in a shape depending on the geometry of the imaging system on a substantially flat plane. The MMAL works as a reflective focusing lens by making all light scattered from one point of an object have the same periodical phase and converge at one point on the image plane. Each micromirror in the MMAL is controlled to have desired translation and rotation to satisfy the convergence and phase matching conditions for forming an image of the object, wherein each micromirror of the MMAL is actuated by the electrostatic and/or the electromagnetic force. The focal length and the optical axis of the MMAL are changed by controlling the rotation and translation of each micromirror in the MMAL. Also, the aberrations of the three-dimensional camcorder are corrected by controlling the rotation and translation of each micromirror in the MMAL.

The following US patents and applications describe the variable focal length MMAL: U.S. Pat. No. 6,934,072 to Kim, U.S. Pat. No. 6,934,073 to Kim, U.S. patent application Ser. No. 10/855,554 filed May 27, 2004, U.S. patent application Ser. No. 10/855,715 filed May 27, 2004, U.S. patent application Ser. No. 10/857,714 filed May 28, 2004, U.S. patent application Ser. No. 10/857,280 filed May 28, 2004, U.S. patent application Ser. No. 10/893,039 filed May. 28, 2004, and U.S. patent application Ser. No. 10/983,353 filed Mar. 4, 2005, all of which are hereby incorporated by reference.

The variable focal length MMAL changes its surface profile to change its focal length by controlling the rotation and translation of each micromirror. The focal length of the variable focal length MMAL is changed in a plurality of steps in order to scan the whole object (or scene).

The imaging unit captures images formed on the image plane by the variable focal length MMAL. As the focal length of the variable focal length MMAL is changed, the in-focus regions of the object are also changed accordingly.

The image processing unit produces three-dimensional image data using the images captured by the imaging unit and the focal length information of the MMAL. The image processing unit extracts the substantially in-focus pixels of each captured image received from the imaging unit and generates a corresponding depthwise image using the extracted in-focus pixels of each captured image. Depth information, or the distance between the imaging system and the in-focus region of the object is determined by known imaging system parameters including the focal length and the distance between the MMAL and the image plane. A set of depthwise images taken at different focal lengths with a fast imaging rate represents the object or scene at a given moment. The image processing unit can combine these depthwise images to make an all-in-focus image. There are several methods for the image processing unit to obtain depthwise images or an all-in-focus image (e.g. edge detection filter). Recent advances in both the image sensor and the image processing unit make them as fast as they are required to be. The pair of stereoscopic images is generated by the image processing unit using all-in-focus image and the depth information for each pixel of the all-in-focus image, where the three-dimensional information of the object is projected on two virtual image planes whose centers are separated at certain distance, which simulates two-camera systems having different viewing angles. The three-dimensional camcorder may further comprise a storage medium storing three-dimensional image data. Depending on the display method of the three-dimensional display system, the image processing unit generates a set of depthwise images representing the object at a given moment and the depth information for each depthwise image using the images captured by the imaging unit, an all-in-focus image and the depth information for each pixel of the all-in-focus image using the images captured by the imaging unit, or a pair of stereoscopic images using an all-in-focus image and the depth information for each pixel of the all-in-focus image. These image data are transferred to the three-dimensional viewfinder to find and focus the object or recorded on the storage medium. Image sensing and image processing time is faster than the persistent rate of human eyes to have real-time three-dimensional images.

Another objective of the invention is to provide a three-dimensional camcorder, further comprising additional MMAL or MMALs for providing zoom function, wherein the MMALs magnify the image and keep the image in-focus by changing the focal length of each MMAL without macroscopic mechanical movements of lenses.

Still another objective of the invention is to provide a three-dimensional camcorder having auto focusing function by changing the focal length of MMAL, wherein the focal length of MMAL for auto focusing is determined by the depth information. The auto focusing systems using the MMAL are described in U.S. patent application Ser. No. 10/896,146, the contents of which are hereby incorporated by reference.

Still another objective of the invention is to provide a three-dimensional camcorder having vibration correction capability, wherein the three-dimensional camcorder further comprises a vibration determination device, communicatively coupled to the MMAL, configured to measure vibration of the three-dimensional camcorder and to generate a vibration correction signal. The MMAL is adjusted to change its optical axis by controlling the rotation and translation of each micromirror in the MMAL, based at least in part on the vibration correction signal to correct for the vibration of the three-dimensional camcorder. The vibration correction system using the MMAL is described in U.S. patent application Ser. No. 10/979,612, the contents of which are hereby incorporated by reference.

Still another objective of the invention is to provide a three-dimensional camcorder imaging an object which does not lie on the nominal optical axis by using at least one MMAL without macroscopic mechanical movement of the imaging system.

Still another objective of the invention is to provide a three-dimensional camcorder compensating for aberrations using at least one MMAL. Since the MMAL is an adaptive optical component, the MMAL compensates for phase errors of light introduced by the medium between an object and its image and/or corrects the defects of the three-dimensional camcorder that may cause the image to deviate from the rules of paraxial imagery by controlling individual micromirrors in the MMAL.

The variable focal length MMAL is reflective lens. The three-dimensional camcorder may further comprise a beam splitter positioned in the path of light between the imaging unit and the MMAL to have normal incident optical geometry onto the MMAL. Alternatively, in order to deflect the light into a sensor, the MMAL is tilted in the imaging system of the camcorder so that the normal direction of the MMAL is different from the optical axis of the imaging system. When the MMAL is tilted about an axis (tilting axis), which is perpendicular to the optical axis of the imaging system, the surface profile of the MMAL is symmetric about an axis which is perpendicular to the optical axis and tilting axis. The tilted MMAL can cause non axis-symmetric aberrations. To have the desired focal length and compensate for non axis-symmetric aberrations, each micromirror has one translational motion along the normal axis to the plane of each MMAL and two rotational motions about two axes in the plane of each MMAL.

In order to obtain a color image, the MMAL is controlled to compensate for chromatic aberration by satisfying the phase matching condition for each wavelength of Red, Green, and Blue (RGB), or Yellow, Cyan, and Magenta (YCM), respectively. The three-dimensional camcorder may further comprise a plurality of bandpass filters for color imaging. Also, the three-dimensional camcorder may further comprise a photoelectric sensor. The photoelectric sensor comprises Red, Green, and Blue sensors or Yellow, Cyan, and Magenta sensors, wherein color images are obtained by the treatments of the electrical signals from each sensor. The treatment of electrical signal from sensor is synchronized and/or matched with the control of the MMAL to satisfy the phase matching condition for each wavelength of Red, Green, and Blue or Yellow, Cyan, and Magenta, respectively.

Furthermore, the MMAL can be controlled to satisfy phase matching condition at an optimal wavelength to minimize chromatic aberration, wherein optimal wavelength phase matching is used for getting a color image. The MMAL is controlled to satisfy phase matching condition for the least common multiple wavelength of Red, Green, and Blue or Yellow, Cyan, and Magenta lights to get a color image.

The three-dimensional camcorder may further comprise an optical filter or filters for image quality enhancement.

The three-dimensional camcorder may further comprise an auxiliary lens or group of lenses for image quality enhancement.

The three-dimensional camcorder may further comprise extra MMAL or MMALs to compensate for aberrations of the three-dimensional camcorder including chromatic aberration.

Still another objective of the invention provides a three-dimensional viewfinder for the three-dimensional camcorder, which allows users to find and focus an object in the three-dimensional space and replay recorded three-dimensional video images using one of various display methods including stereoscopic display and volumetric display.

To display three-dimensional video images in the stereoscopic display, the three-dimensional viewfinder comprises an image data input unit, a two-dimensional display, and a stereoscopic glasses. The image data input unit receives a pair of stereoscopic images from the image processing unit or from the storage medium. The two-dimensional display, communicatively coupled to the image data input unit, displays these stereoscopic images in turns within the persistent rate of the human eye. These images can be viewed by stereoscopic glasses.

Alternatively, the three-dimensional viewfinder can comprise an image input unit and an autostereoscopic two-dimensional display. The image data input unit receives a pair of stereoscopic images from the image processing unit or from the storage medium. The autostereoscopic two-dimensional display, communicatively coupled to the image data input unit, displays stereoscopic images in turns within the persistent rate of the human eyes. When autostereoscopic viewfinder is used, the image can be viewed without stereoscopic glasses.

Since the pair of stereoscopic images is generated using all-in-focus image and the depth information for each pixel of the all-in-focus image, the resulting three-dimensional image is all-in-focused (or sharp) unlike the three-dimensional images provided by conventional stereoscopic imaging systems, where the images are in-focused only for a portion of object within the depth of field of the imaging system.

To display three-dimensional video images in a volumetric display, the three-dimensional viewfinder comprises an image data input unit, a two-dimensional display, and a variable focal length MMAL. The image data input unit receives the depthwise image data or from the storage medium. The two-dimensional display, communicatively coupled to the image data input unit, displays depthwise images sequentially within the persistent rate of the human eyes. The variable focal length MMAL, optically coupled to the two-dimensional display, receives light from the two-dimensional display and forms a corresponding image at the required location in the space using the depth information of the depthwise image by changing the focal length of the MMAL. The image formed by the variable focal length MMAL is parallel to the three-dimensional viewfinder screen and located at the corresponding depth along the surface normal direction of the three-dimensional viewfinder screen. The location of the image formed in space is adjusted by changing the focal length of the variable focal length MMAL, which is synchronized with the two-dimensional display so that the variable focal length MMAL can have a focal length corresponding to the depth information of the depthwise image displayed in the two-dimensional display. As a set of depthwise images representing an object at a given moment are sequentially displayed in the two-dimensional display, a three-dimensional image of the object is formed in the space accordingly and perceived as three-dimensional by a viewer. The number of depthwise images representing the object at a given moment (number of depths) depends on the depth resolution requirement, the refresh rate of the two-dimensional display, and the focusing speed of the variable focal length MMAL, and may increase for a better image quality. A set of depthwise image representing an object at a given moment is displayed at least at the persistent rate of the human eye. The focusing speed of the variable focal length MMAL is at least equal to the product of the persistent rate of the human eye and the number of depths so that three-dimensional images formed in space looks realistic to the viewer.

The three-dimensional image information recorded on the storage medium can be displayed in the three-dimensional viewfinder as well as other three-dimensional display devices such as TV, computer monitor, etc.

Still another objective of the invention provides a camcorder, comprising a two-dimensional viewfinder displaying the all-in-focus image.

Still another objective of the invention provides the three-dimensional viewfinder, wherein the focal length of the variable focal length MMAL is fixed to be used as a two-dimensional viewfinder.

Although the present invention is briefly summarized herein, the full understanding of the invention can be obtained by the following drawings, detailed description, and appended claims.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
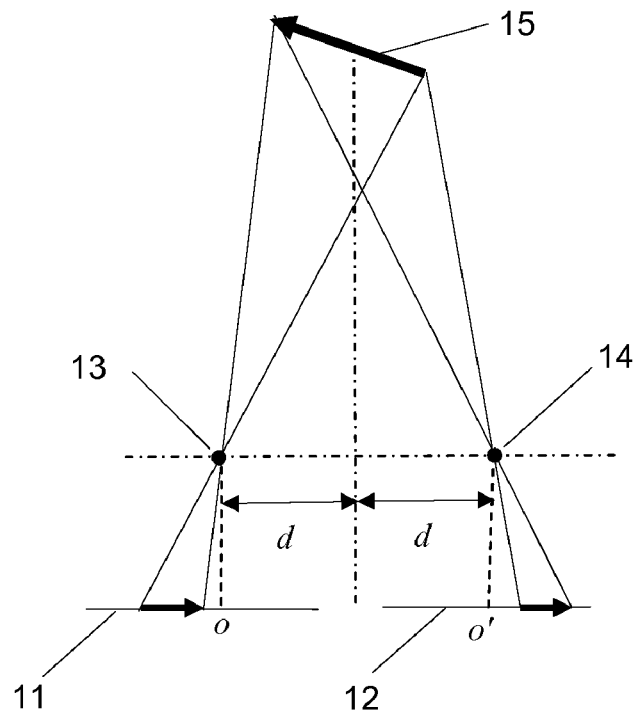
FIG. 1 is a schematic illustration of a two-camera system which provides a pair of stereoscopic images.
Figure 2:
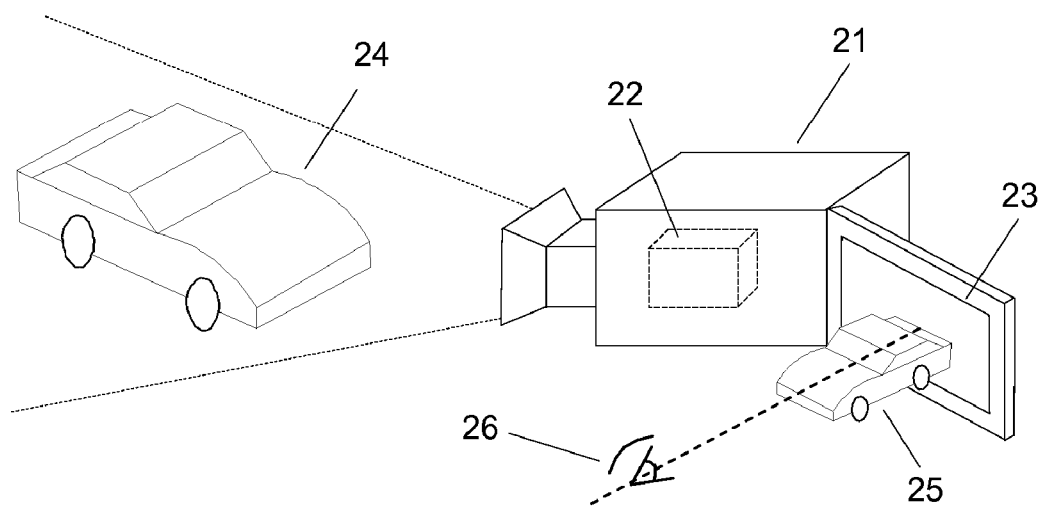
FIG. 2 is a schematic illustration of a three-dimensional camcorder with a three-dimensional viewfinder.
Figure 3:
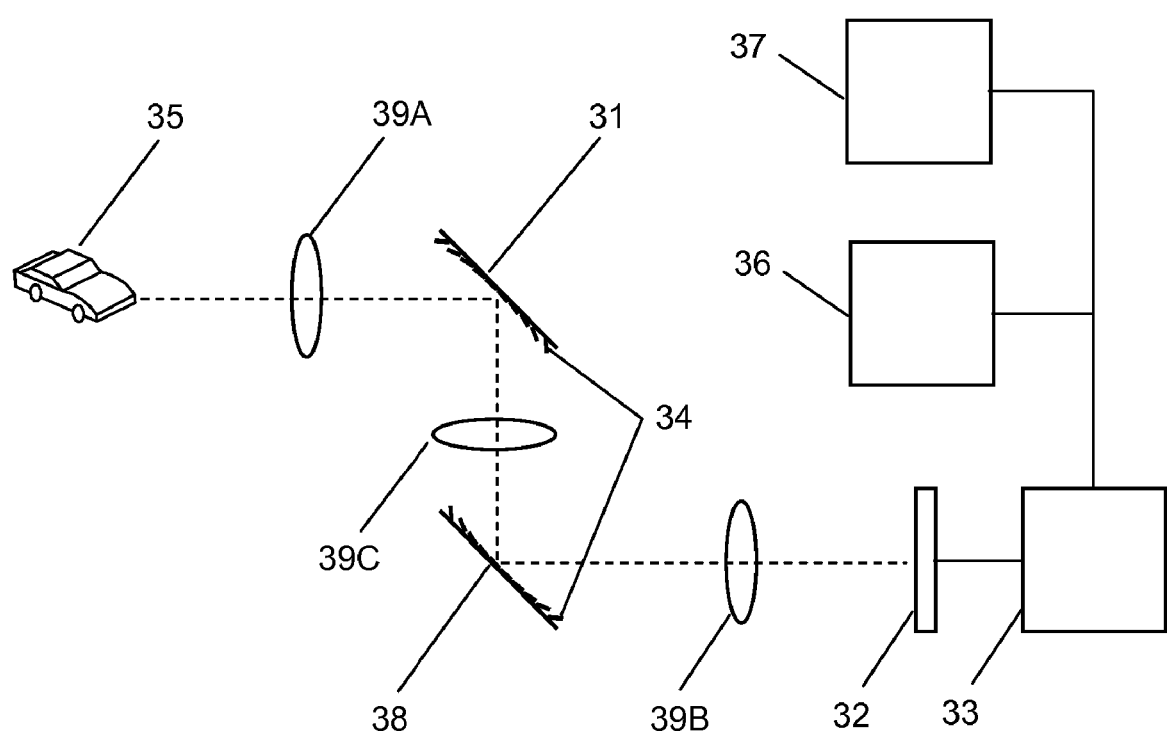
FIG. 3 is a schematic illustration of a three-dimensional imaging system for the three-dimensional camcorder.
Figure 8:
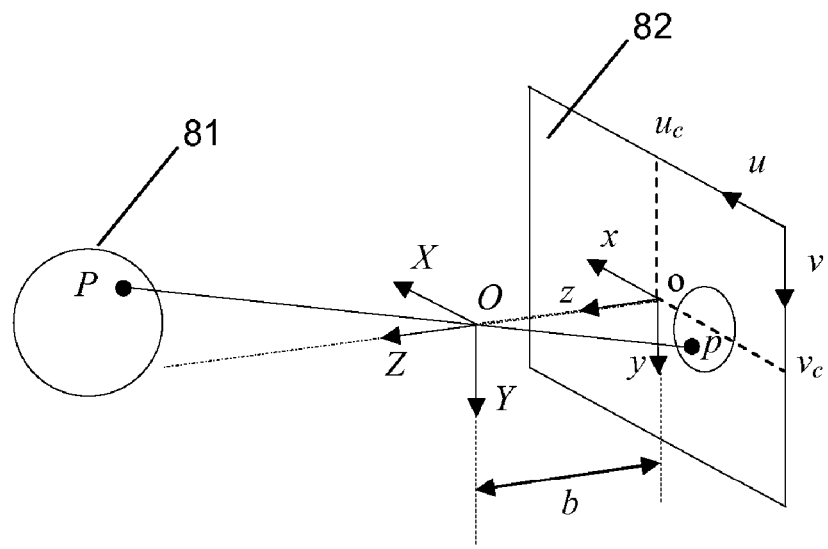
FIG. 8 is a schematic illustration representing the reconstruction of three-dimensional coordinates of an object.
Figure 9:
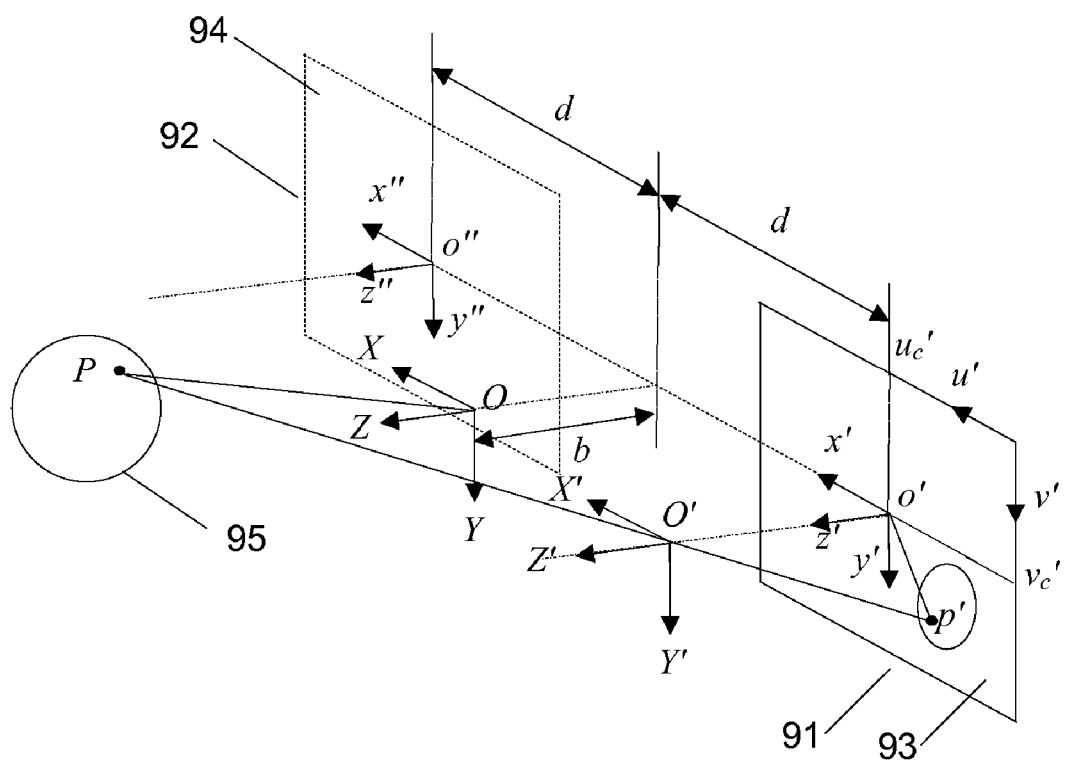
FIG. 9 is a schematic illustration generating a pair of stereoscopic images using reconstructed three-dimensional position information.
Figure 10:
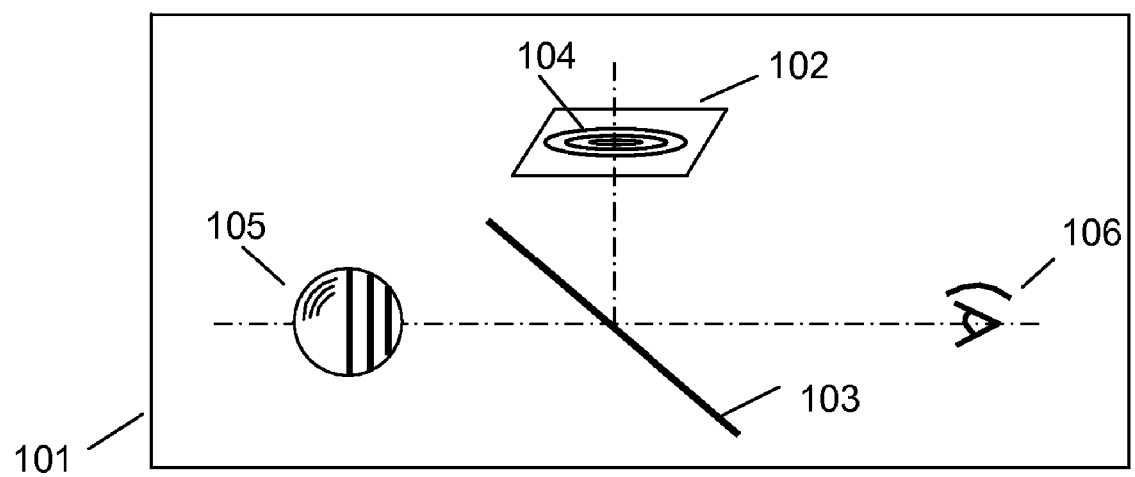
FIG. 10 is a schematic illustration of a three-dimensional viewfinder displaying three-dimensional video images with a volumetric method.
Figure 11:
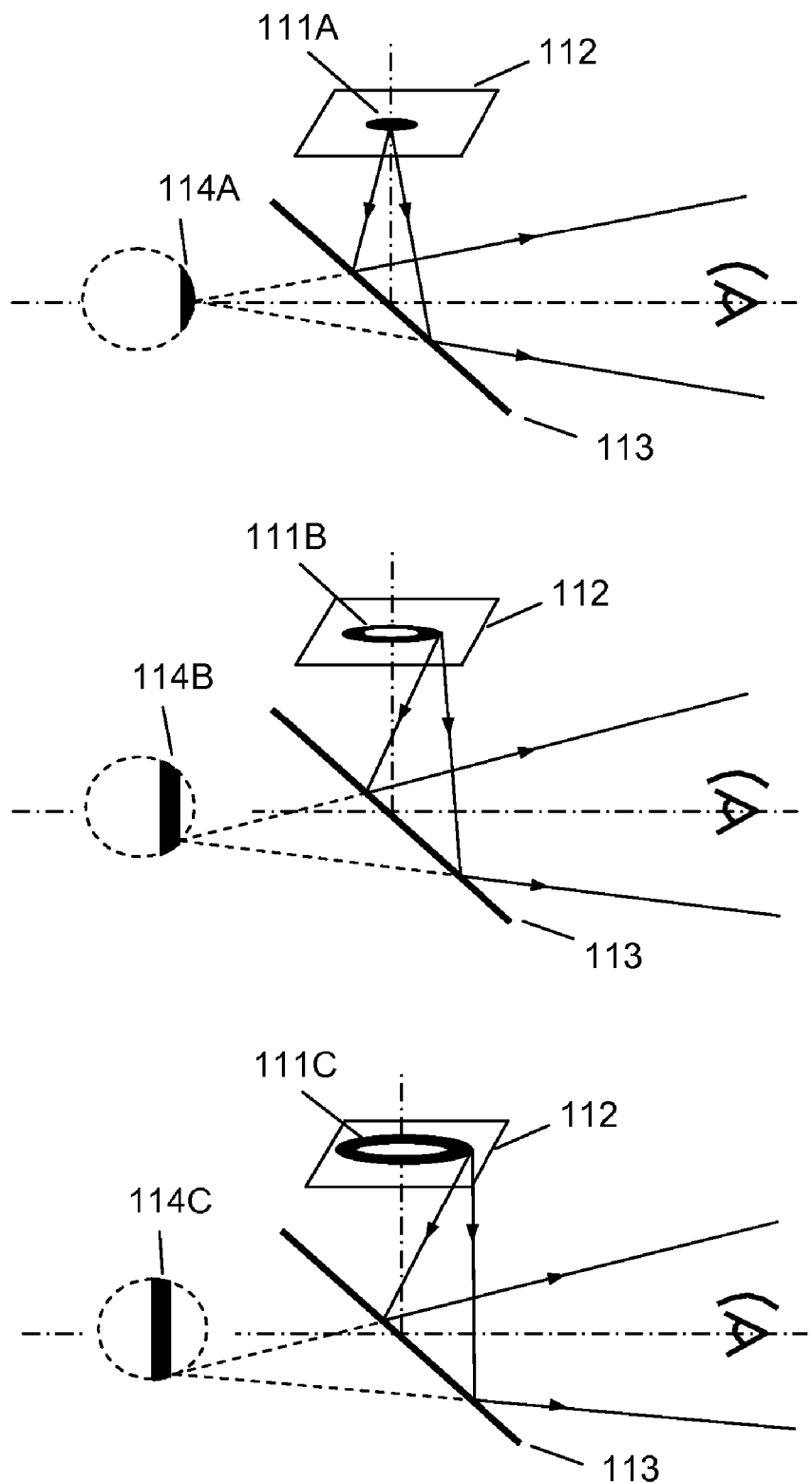
FIG. 11 shows how a two-dimensional display and a variable focal length MMAL display three-dimensional images.

FIG. 2 illustrates a three-dimensional camcorder 21 comprising a three-dimensional imaging system 22 and a three-dimensional viewfinder 23. The three-dimensional imaging system 22 captures at least one image of an object 24 to provide depthwise images and the depth information for each depthwise image, as shown in FIG.3, one all-in-focus image and the depth information for each pixel of the all-in-focus image, or a pair of stereoscopic images, as shown in FIGS. 8 and 9, depending on the display method. The three-dimensional viewfinder 23, communicatively coupled to the three-dimensional imaging system to receive image data and its depth information, displays three-dimensional video image 25 in real-time to allow a viewer 26 to find and focus the object 24 in the three-dimensional space and replays recorded three-dimensional video images using various display methods, as shown in FIGS. 9, 10, and 11.

FIG. 3 illustrates a three-dimensional imaging system for the three-dimensional camcorder comprising at least one variable focal length MicroMirror Array Lens (MMAL) 31, an imaging unit 32, optically coupled to the MMAL, capturing images formed on the image plane by the variable focal length MMAL 31, and an image processing unit 33, communicatively coupled to the imaging unit 32, producing three-dimensional image data using the images captured by the imaging unit 32 and the focal length information of the variable focal length MMAL 31. The variable focal length MMAL 31 comprising a plurality of micromirrors 34 changes its surface profile to change its focal length by controlling the rotation and translation of each micromirror 34 in the MMAL. The focal length of the variable focal length MMAL 31 is changed in a plurality of steps in order to scan the whole object (or scene) 35.

The imaging unit 32 comprising at least one two-dimensional image sensor captures images formed on the image plane by the variable focal length MMAL 31. As the focal length of the variable focal length MMAL 31 is changed, the in-focus regions of the object are also changed accordingly.

The image processing unit 33 extracts the substantially in-focus pixels of each captured image received from the imaging unit and generates a corresponding depthwise image using the extracted in-focus pixels of each captured image. Depth information or the distance between the imaging system and the in-focus region of the object is determined by known imaging system parameters including the focal length of the MMAL and the distance between the MMAL and the image plane. The image processing unit 33 can combine a set of depthwise images representing the object at a given moment to make an all-in-focus image. Depending on the display method of the three-dimensional display system, the three-dimensional imaging system can provides depthwise images and the depth information for each depthwise image, one all-in-focus image and the depth information for each pixel of the all-in-focus image, or a pair of stereoscopic images generated by the image processing unit 33 using all-in-focus image and the depth information for each pixel of the all-in-focus image. These image data are transferred to an image data input unit 36 in the three-dimensional viewfinder to find and focus the object 35 or recorded on the storage medium 37. All the processes obtaining the three-dimensional image information representing the object at a given moment are achieved within a unit time which is less than or equal to the persistent rate of the human eye.

The three-dimensional imaging system for the three-dimensional camcorder can image an object which does not lie on the nominal optical axis by using the MMAL 31 without macroscopic mechanical movement of the three-dimensional imaging system, as shown in the FIG. 5.

The three-dimensional imaging system for the three-dimensional camcorder further comprises a second variable focal length MMAL 38 to provide zoom function. As the first variable focal length lens 31 changes the image size, the image is defocused because the image position is also changed. Therefore, the focal lengths of the two variable focal length MMALs 31 and 38 are changed in unison to magnify and keep the image in-focus. Variable focal length lenses provide zoom function without macroscopic mechanical movements of lenses.

The three-dimensional imaging system for the three-dimensional camcorder provides auto focusing function capturing clear images using variable focal length MMALs 31 and/or 38, as shown in FIG. 6.

The three-dimensional imaging system for the three-dimensional camcorder provides vibration correction function using variable focal length MMALs 31 and/or 38, as shown in FIG. 7.

The three-dimensional imaging system for the three-dimensional camcorder provides compensation for aberrations of the system using variable focal length MMALs 31 and/or 38.

The three-dimensional imaging system for the three-dimensional camcorder may further comprise a first auxiliary lens group 39A to bring the object into focus.

The three-dimensional imaging system for the three-dimensional camcorder may further comprise a second auxiliary lens group 39B to focus the image onto an image sensor.

The three-dimensional imaging system for the three-dimensional camcorder may further comprise a third auxiliary lens group 39C to produce an inverted image.

The three-dimensional imaging system for the three-dimensional camcorder may further comprise an optical filter or filters for image quality enhancement.

The three-dimensional imaging system for the three-dimensional camcorder may further comprise additional auxiliary lens or group of lenses for image quality enhancement.

Figure 4:
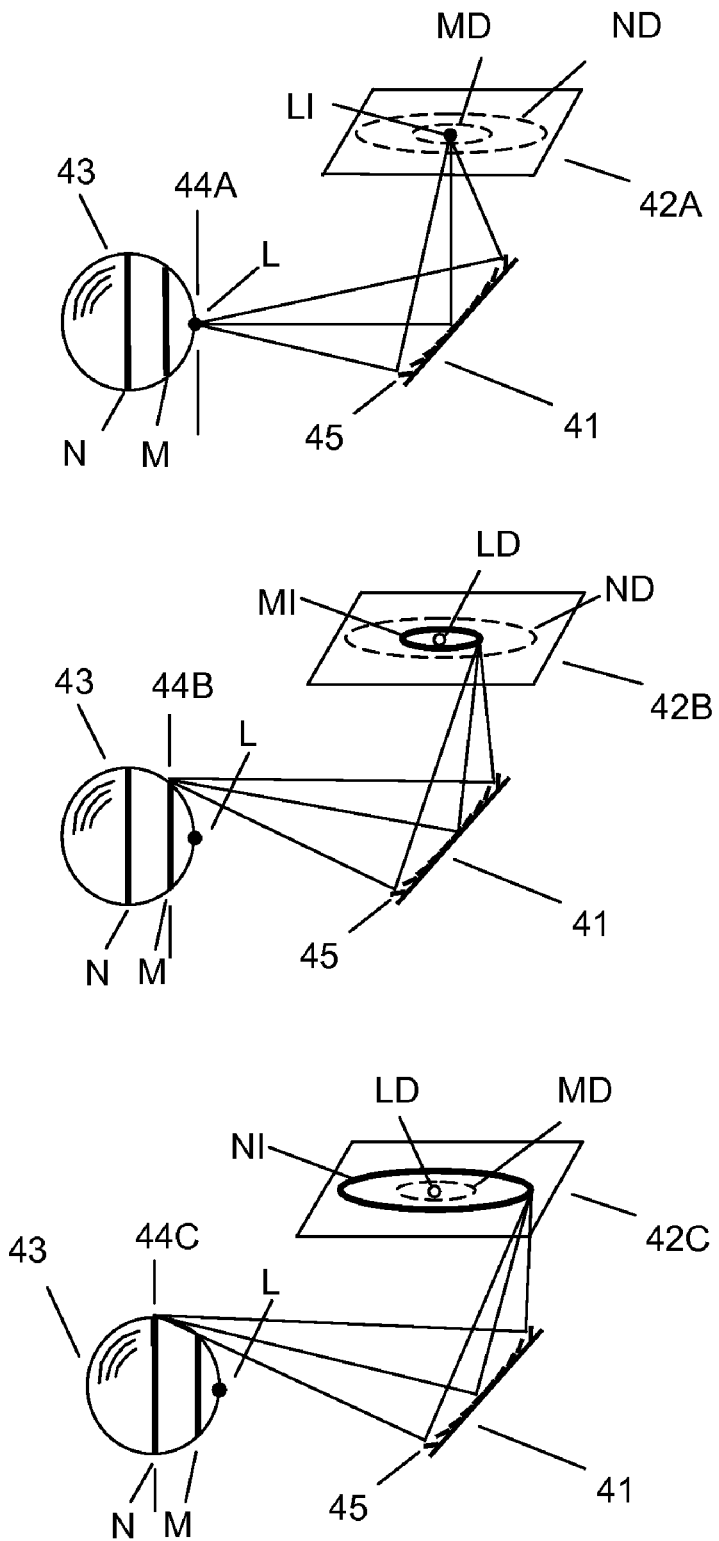
FIG. 4 shows how a three-dimensional image is obtained from two-dimensional images captured by a variable focal length MicroMirror Array Lens (MMAL)

FIG. 4 shows how a three-dimensional image is obtained from two-dimensional images captured by a variable focal length MMAL 41. Two-dimensional images 42A, 42B, and 42C are captured by changing the focal length of the MMAL 41. Captured two-dimensional images 42A, 42B, and 42C have different in-focus pixels because the in-focus plane in an object 43 is varied as the focal length of the MMAL 41 is varied. The captured two-dimensional image 42A with the first focal length has an in-focus image LI which is the image of the portion L of the object 43. The portion L of the object 43 lies on the in-focus plane 44A while images MD, ND of portion M, N of the object 43 are defocused. Therefore, the image processing unit can extract the in-focus pixels LI from the captured two-dimensional images 42A and generate a depthwise image, which contains only in-focus pixels. The distance between the in-focus plane 44A in the object and the imaging system can be estimated by using known imaging system parameters including the focal length of the MMAL 41 and the distance between the MMAL 41 and the image plane. The captured two-dimensional images 42B and 42C with the second and the third focal lengths are processed in the same manner as the first captured two-dimensional image 42A to provide depthwise images and the depth information for each depthwise image. The focal length of the MMAL 41 is changed by controlling the rotation and/or translation of each the micromirror 45 using electrostatic and/or electromagnetic force. For any given focal length, the imaging system can have only one in-focus plane in the object, which may lead to infinitesimal focal length changes with infinite number of steps to provide an all-in-focus image. In practice, the imaging system has a depth of field, which is the distance from near to far that the object appears to be in-focus. In this invention, the imaging processing unit extracts substantially in-focus pixels from the captured two-dimensional image that appears to be in-focus.

Figure 5A:
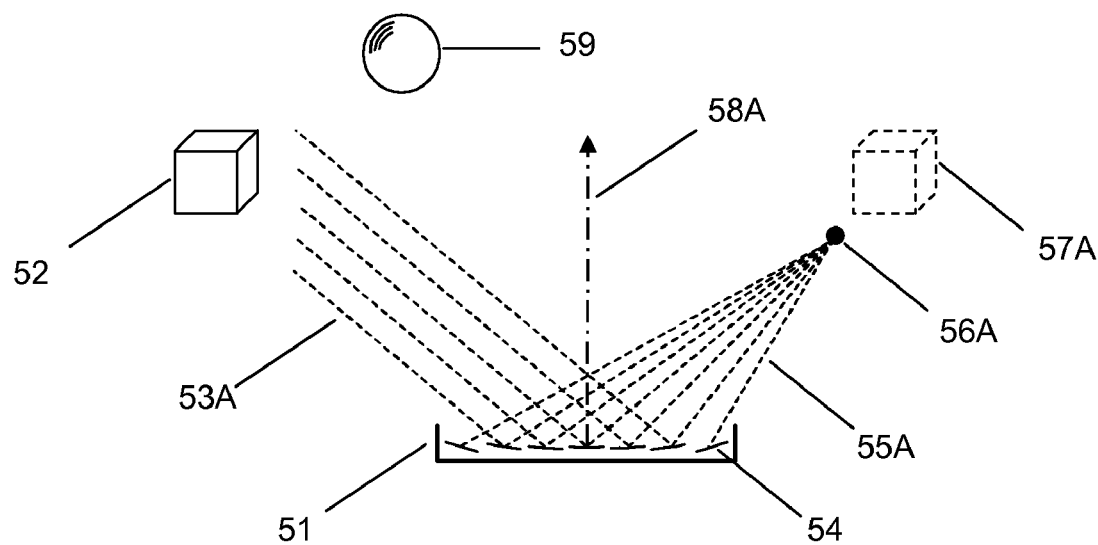
FIG. 5 shows how the optical axis of the MMAL changes.

FIG. 5 shows how the optical axis of the MMAL changes. A bunch of light is focused by the MMAL 51. In FIG. 5a, a cube object 52 is imaged onto the image plane. The light 53A from the object 52 is reflected by each of the micromirror 54. The reflected light 55A is focused onto the focal point 56A of the image and finally makes an image of a cube 57A in the image sensor. During the focusing process the optical axis is defined as a surface normal direction 58A of a micromirror 54.

Figure 5B:
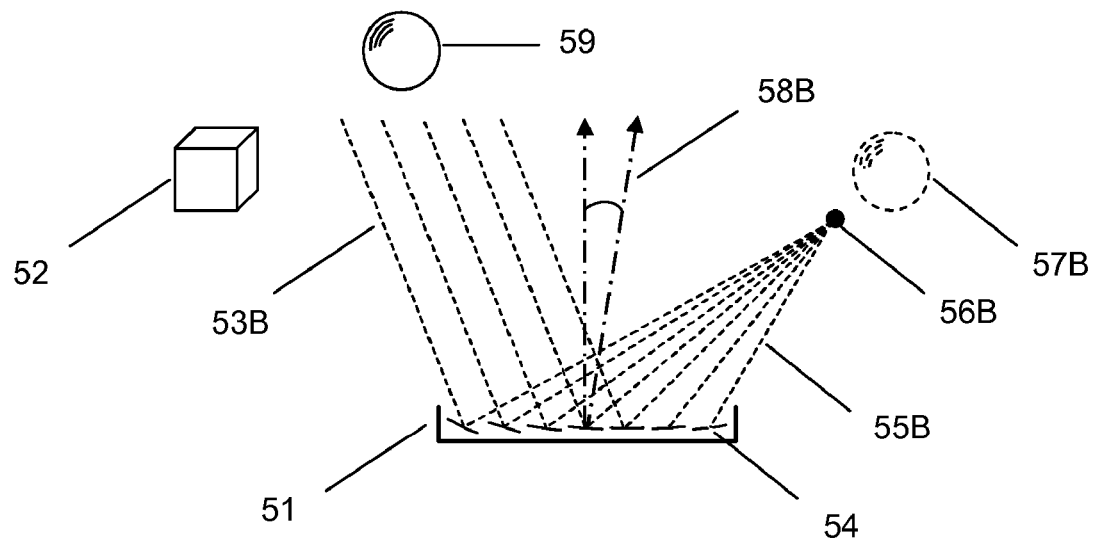

As shown in FIG. 5b, the MMAL can make a different image 57B from a different object 59 without macroscopic movements. By changing the respective angles of the micromirrors 54, this time the MMAL accepts the light 53B from the sphere 59. The reflected light 55B is focused onto a focal point 56B and makes the image of the sphere 57B. This time the optical axis is changed by an angle and becomes the surface normal direction 58B of a micromirror.

Figure 6A:
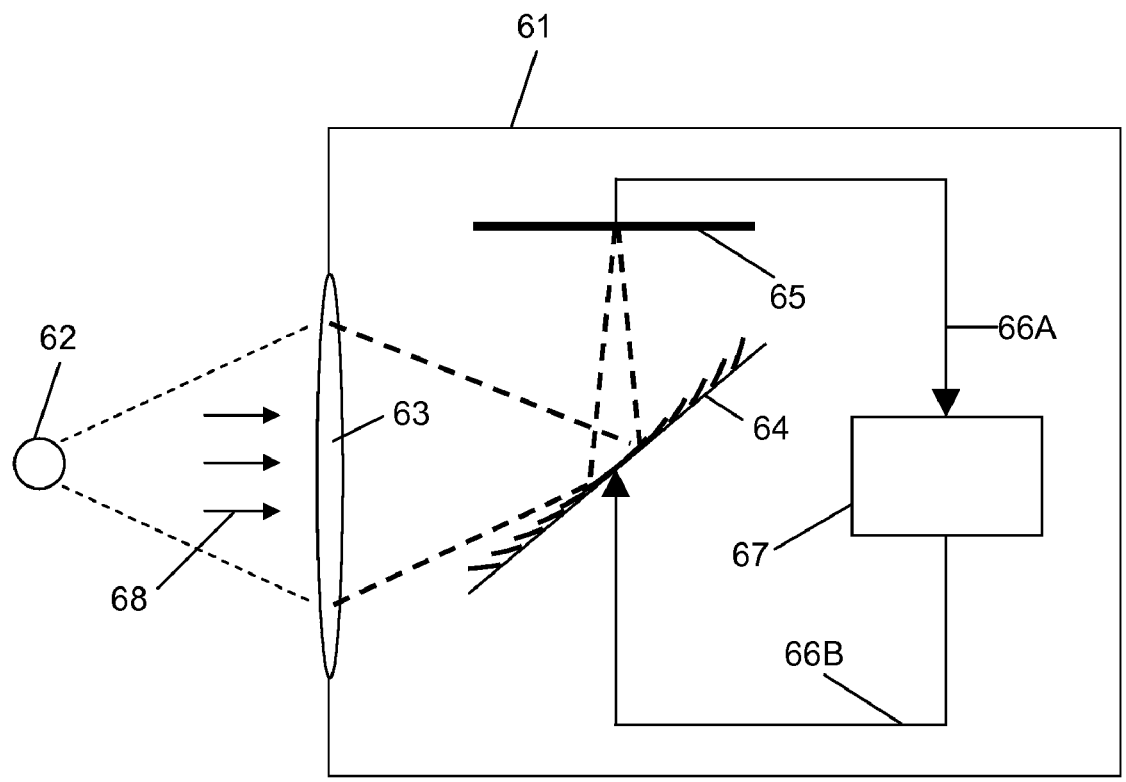
FIG. 6 is a schematic illustration of a three-dimensional imaging system with auto focusing function using a MMAL.

FIG. 6a illustrates a three-dimensional imaging system 61 with auto focusing function using a variable focal length MMAL. First, the light scattered from an object 62 is refracted by a lens 63 and is reflected by a MMAL 64 to an image sensor 65. The light reflected from the MMAL is received by the image sensor 65 and converted into an electrical signal 66A carrying the object's image data. The electrical signal is then sent to a signal processor 67, where the image data is analyzed and compared to the camera focus criteria. Based on the compared image data, as discussed in further detail below, the signal processor 67 generates a control signal 66B. The control signal is sent to the MMAL to adjust the focal length of the MMAL until the image quality of the image data meets the focus criteria.

Figure 6B:
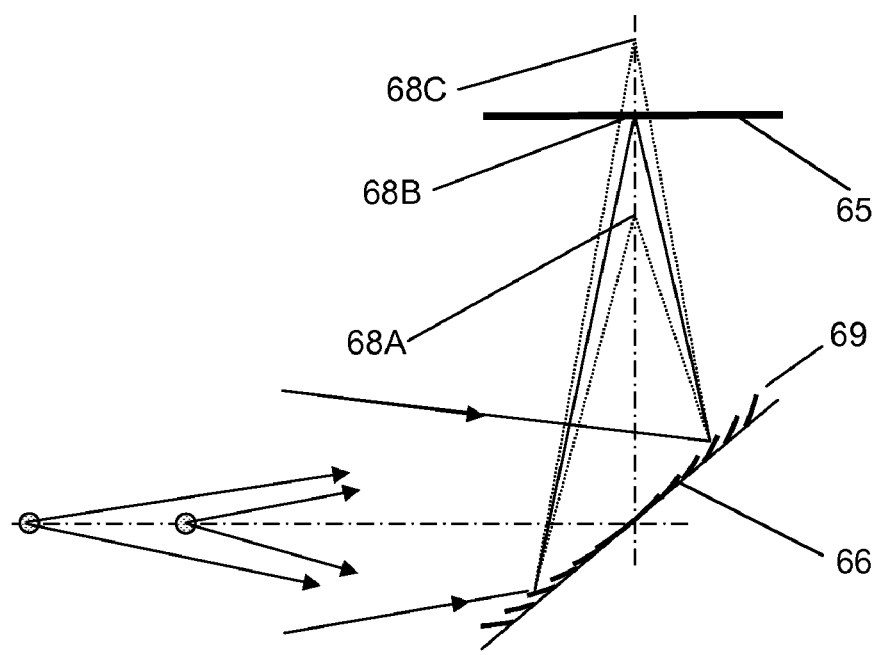

As shown in FIG. 6b, the focal length of the MMAL 64 affects the quality of the image received by the image sensor 65. For instance, if the MMAL has a focal length which causes the reflected light 68 to be in-focused at a point 68A short of the image sensor 65, the image sensor will generate an electrical signal 66A carrying "blurred" image data. Accordingly, the signal processor will process the "blurred" signal and send a control signal 66B to the MMAL, causing the positions of the micromirrors 69 to adjust to lengthen the focal length of the MMAL.

Similarly, if the focal length of the MMAL causes the reflected light to be in-focused at a point 68C behind the image sensor 65, the image sensor will likewise generate an electrical signal 66A carrying "blurred" image data. Accordingly, the signal processor will process the "blurred" signal and send a control signal 66B to the MMAL, causing the arrangement of the micromirrors 69 to adjust to shorten the focal length of the MMAL.

In that regard, the focal length of the MMAL is adjusted in an iterative process until the reflected light is in-focused at a point 68B on the image sensor, which provides a "sharp" image, satisfying the camera focus criteria. The iterative process is preferably completed within the persistent rate of the human eye. Thus, the signal processor must have a speed equal to or grater than the product of the number of iterative adjustments, number of depths, and the persistent rate of the human eye.

Figure 7A:
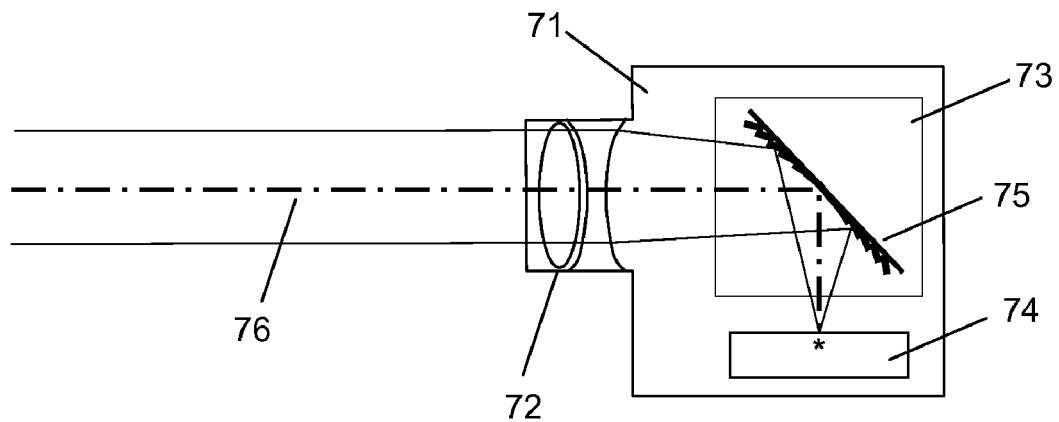
FIG. 7 is a schematic illustration of a three-dimensional imaging system having vibration correction function using a MMAL.
Figure 7B:
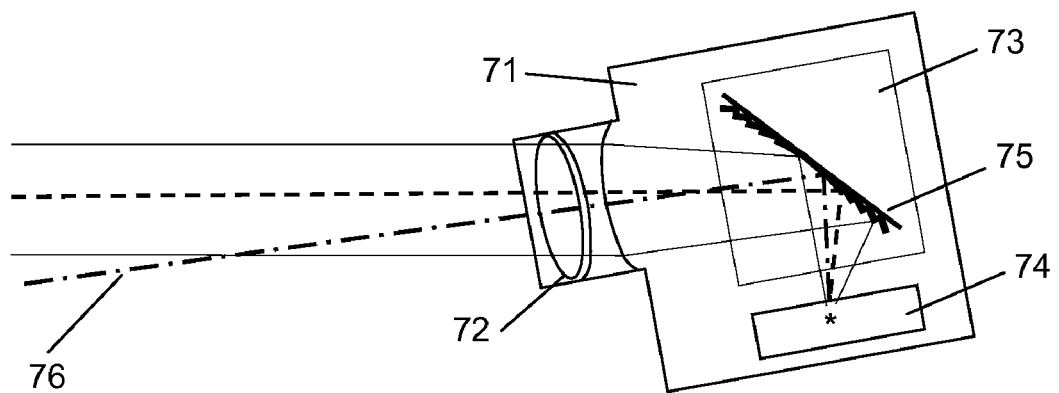

FIG. 7 illustrates a three-dimensional imaging system 71 having vibration correction function using a MMAL, wherein vibration is corrected without any macroscopic motion. FIG. 7a shows an imaging system with the vibration correction function in operation when there is no vibration. FIG. 7b shows an imaging system with the vibration correction function in operation when vibration exists. The imaging system 71 includes a lens or lens group 72, the vibration correction device 73, and an image sensor 74. The vibration correction device 73 comprises a MMAL 75, configured to focus an object image onto an image sensor 74 and to correct optical axis error and a vibration determination device, communicatively coupled to the MMAL 75, configured to measure the vibration of the imaging system 71 and to generate a vibration correction signal. Any type of vibration determination devices may be used in conjunction with the vibration correction device 73. The MMAL 75 is adjusted to change its optical axis 76 by controlling the rotation and translation of each micromirror in the MMAL, based at least in part on the vibration correction signal to correct the vibration of the imaging system 71.

FIGS. 8 and 9 illustrate how to generate a pair of stereoscopic image from the all-in-focus image and the depth information for each pixel of the all-in-focus image to display stereoscopic images in the three-dimensional viewfinder. FIG. 8 is a schematic illustration representing the reconstruction of three-dimensional coordinates of an object 81 from the all-in-focus image and the depth information for each pixel of the all-in-focus image. Consider a three-dimensional camera coordinate system (X, Y, Z), of which origin O is at an optical center and Z axis is along an optical axis. Also, consider an image coordinate system (x, y, z), of which origin o is at the center of the image plane 82 and z axis is along the optical axis, and x and y axes are parallel to X and Y axes, respectively. The image plane has a pixel coordinate system (u, v) which satisfies $$u = u_c + \frac{x}{\text{pixel width}}, v = v_c + \frac{y}{\text{pixel width}}$$

where ($u_c$, $v_c$) represents the center of the image plane in the pixel coordinate system (u, v).

The each pixel on the all-in-focus image has a corresponding focal length f=f(u,v). The position of a point P on the object 81 with the camera coordinates (X, Y, Z) is determined by thin lens formula and geometry as follows;

$$Z = \frac{bf(u, v)}{f - b}$$

$$X = \frac{-Zx}{b}$$

$$Y = \frac{-Zy}{b}$$

The above relationship can be applied to all pixels on the image plane 82.

FIG. 9 is a schematic illustration generating pair of stereoscopic images using reconstructed three-dimensional position information. Reconstructed three-dimensional position information in the camera coordinates (X, Y, Z) is projected on two virtual camera systems 91 and 92 in order to create a pair of stereoscopic images. Two virtual camera systems 91 and 92 are geometrically identical with the actual camera system shown in FIG. 8. Superscripts ' and " are used for virtual camera systems 91 and 92, respectively. The virtual camera system 91 is placed at −d distance from the origin O in the direction of X axis and the camera system 92 is place at d distance from the origin O in the direction of X axis. The virtual camera systems have a focal length $f_0$ and the distance between a virtual optical centers O' and O" and virtual image planes 93 and 94 is b, respectively. The three-dimensional position information of the object 95 is projected on virtual camera systems 91 and 92. Consider the virtual camera system 91. Firstly, needed is a change of coordinates from the camera coordinate system P=(X, Y, Z) to the virtual camera coordinate system P'=(X', Y', Z').

$$P' = R(P-t)$$

where R is a 3×3 rotation matrix representing the orientation of the virtual camera coordinate system with respect to the camera coordinate system and t is a translation vector representing the displacement of the origin of the virtual camera coordinate system from the origin of the camera coordinate system. For example, R is an identity matrix and t=(−d, 0, 0). The corresponding pixel location p' is obtained $$u' = u'_c - \frac{bX'}{Z'} \cdot \frac{1}{\text{pixel width}}$$

$$v' = v'_c - \frac{bY'}{Z'} \cdot \frac{1}{\text{pixel width}}$$

These processes are repeated for all pixels in the all-in-focus image to generate one of stereoscopic images. The same steps are applied for the virtual camera system 92, where R is the identity matrix and t=(d, 0, 0) to generate the other stereoscopic image. The problem reconstructing a pair of stereoscopic images is greatly simplified for illustrative purpose. A pair of stereoscopic images is displayed in the three-dimensional viewfinder in turns within the persistent rate of the human eye. These images can be viewed by stereoscopic glasses. When autostereoscopic viewfinder is used, the image can be viewed without stereoscopic glasses. Since the pair of stereoscopic images is generated using all-in-focus image and the depth information for each pixel of the all-in-focus image, the resulting three-dimensional image is all-in-focused (or sharp).

FIG. 10 shows a three-dimensional viewfinder 101 according to one embodiment of the present invention to display three-dimensional video images with a volumetric method. The three-dimensional viewfinder 101 comprises an image data input unit, a two-dimensional display 102, communicatively coupled to the image data input unit, and a variable focal length MMAL 103, optically coupled to the two-dimensional display 102. The image data input unit receives depthwise images and the depth information for each depthwise image from the image processing unit 33 or storage medium 37 in FIG. 3. The two-dimensional display 102 displays one depthwise image 104 at a time received from the image data input unit. The two-dimensional display 102 displays only pixels that should be imaged at the same depth at a given frame. The variable focal length MMAL 103 receives light from the two-dimensional display 102 and forms a corresponding image at the required location in the space to generate a three-dimensional image. The location of the image formed in the space depends on the depth information of the depthwise image and is adjusted by changing the focal length of the variable focal length MMAL 103. The variable focal length MMAL 103 is synchronized with the two-dimensional display 102 so that the variable focal length MMAL 103 can have a focal length corresponding to the depth information of the depthwise image 104 displayed in the two-dimensional display 102. As a set of depthwise images representing an object at a given moment are sequentially displayed in the two-dimensional display 102, a three-dimensional image 105 of the object is formed in the space accordingly and perceived as three-dimensional by a viewer 106. The focal length of the variable focal length MMAL 103 can be fixed to be used as a two-dimensional viewfinder. Also, the three-dimensional viewfinder may further comprise an auxiliary lens for increasing the size of the three-dimensional display screen.

FIG. 11 shows how a two-dimensional display and a variable focal length MMAL display three-dimensional images. At a given moment, an object is represented by a set of depthwise images 111A, 111B, 111C, each of which represents a portion of the object having the same image depth. The number of depthwise images representing the object at a given moment (number of depths) depends on the depth resolution requirement, the refresh rate of the two-dimensional display 112, and the focusing speed of the variable focal length MMAL 113 and may increase for a better image quality. The two-dimensional display 112 displays one depthwise image at a time. The variable focal length MMAL 113 receives light from the two-dimensional display 112 and forms a corresponding image 114A, 114B, 114C at the required location in the space to generate a three-dimensional image. The set of depthwise images representing the object at a given moment are sequentially displayed in the two-dimensional display 112 within a unit time. In order to have realistic three-dimensional video images in the space, focusing speed of the variable focal length MMAL 113 and refresh rate of the two-dimensional display 112 must be equal or greater than the product of the persistent rate of the human eye and the number of depths.

For example, assume that the persistent rate of the human eye is 30 Hz and the number of depths is 10. In order to have realistic three-dimensional video images in the space, the focusing speed of the variable focal length MMAL 113 and the refresh rate of two-dimensional display 112 have to be at least equal to 300 Hz, respectively. The variable focal length MMAL 113 of the present invention is capable of changing the focal length fast enough to generate realistic three-dimensional video images.

What is claimed is:

1. A three-dimensional camcorder comprising:
    a) a variable focal length MicroMirror Array Lens (MMAL), wherein the MMAL comprises a plurality of micromirrors, wherein each of the micromirrors in the MMAL is controlled to change the focal length of the MMAL;
    b) an imaging unit which captures images formed on the image plane by the MMAL; and
    c) an image processing unit which produces three-dimensional image data using the images captured by the imaging unit and the focal length information of the MMAL.

2. The three-dimensional camcorder of claim 1, wherein each micromirror in the MMAL is actuated by the electrostatic force.

3. The three-dimensional camcorder of claim 1, wherein the focal length of the MMAL is changed by controlling the rotation and translation of each micromirror in the MMAL.

4. The three-dimensional camcorder of claim 1, wherein the optical axis of the MMAL is changed by controlling the rotation and translation of each micromirror in the MMAL.

5. The three-dimensional camcorder of claim 1, wherein the aberrations of the three-dimensional camcorder is corrected by controlling the rotation and translation of each micromirror in the MMAL.

6. The three-dimensional camcorder of claim 1, further comprising a three-dimensional viewfinder displaying three-dimensional images.

7. The three-dimensional viewfinder of claim 6, comprising:
 a) an image data input unit, receiving a pair of stereoscopic images from the image processing unit or from the storage medium;
 b) a two-dimensional display, communicatively coupled to the image data input unit, displaying stereoscopic images in turns within the persistent rate of the human eyes; and
 c) a stereoscopic glasses, viewing a three-dimensional image.

8. The three-dimensional viewfinder of claim 6, comprising:
 a) an image data input unit, receiving a pair of stereoscopic images from the image processing unit or from the storage medium; and
 b) an autostereoscopic two-dimensional display, communicatively coupled to the image data input unit, displaying stereoscopic images in turns within the persistent rate of the human eyes.

9. The three-dimensional viewfinder of claim 6, comprising:
 a) an image data input unit, receiving depthwise images and the depth information for each depthwise image from the image processing unit or from the storage medium; and
 b) a two-dimensional display, communicatively coupled to the image data input unit, displaying depthwise images sequentially within the persistent rate of the human eyes; and
 c) a variable focal length MMAL, optically coupled to the two-dimensional display, receiving light from the two-dimensional display and forming a corresponding image of the depthwise image at the required location in the space using the depth information of the depthwise image by changing the focal length of the MMAL, wherein the variable focal length MMAL are synchronized with the two-dimensional display so that the variable focal length MMAL can have a focal length corresponding to the depth information of the depthwise image displayed in the two-dimensional display, wherein a set of depthwise image representing an object at a given moment is displayed at least at the persistent rate of the human eye, and wherein the focal length of the MMAL is changed by controlling the rotation and translation of each micromirror in the MMAL.

10. The three-dimensional camcorder of claim 1, wherein the image processing unit generates a set of depthwise images representing the object at a given moment and the depth information for each depthwise image using the images captured by the imaging unit.

11. The three-dimensional camcorder of claim 1, wherein the image processing unit generates an all-in-focus image and the depth information for each pixel of the all-in-focus image using the images captured by the imaging unit.

12. The three-dimensional camcorder of claim 1, wherein the image processing unit generates a pair of stereoscopic images using an all-in-focus image and the depth information for each pixel of the all-in-focus image.

13. The three-dimensional camcorder of claim 1, further comprising a storage medium storing three-dimensional image data.

14. The three-dimensional camcorder of claim 1, wherein the camcorder has auto focusing function by changing the focal length of MMAL.

15. The three-dimensional camcorder of claim 14, wherein the focal length of MMAL for auto focusing is determined by the depth information.

16. The three-dimensional camcorder of claim 1, further comprising additional MMAL or MMALs for providing zoom function, wherein the MMALs magnify the image and keep the image in-focus by changing the focal length of each MMAL.

17. The three-dimensional camcorder of claim 1, further comprising a vibration determination device, communicatively coupled to the MMAL, configured to measure vibration of the three-dimensional camcorder and to generate a vibration correction signal, wherein the MMAL is adjusted to change its optical axis by controlling the rotation and translation of each micromirror in the MMAL, based at least in part on the vibration correction signal to correct for the vibration of the three-dimensional camcorder.

18. The three-dimensional camcorder of claim 1, wherein image sensing and image processing time is faster than the persistent rate of human eyes to have real-time three-dimensional images.

19. The three-dimensional camcorder of claim 1, wherein the MMAL is further controlled to compensate for chromatic aberration by satisfying the phase matching condition for each wavelength of Red, Green, and Blue (RGB) or Yellow, Cyan, and Magenta (YCM), respectively, to get a color images.

20. The three-dimensional camcorder of claim 1, further comprising photoelectric sensors, wherein the photoelectric sensors comprises Red, Green, and Blue (RGB) sensors or Yellow, Cyan, and Magenta (YCM) sensors, wherein color images are obtained by treatments of the electrical signals from each sensor.

21. The three-dimensional camcorder of claim 1, wherein the treatment of electrical signal from each sensor is synchronized and/or matched with the control of the MMAL to satisfy the phase matching condition for each wavelength of Red, Green, and Blue (RGB) or Yellow, Cyan, and Magenta (YCM), respectively.

22. The three-dimensional camcorder of claim 1, wherein the MMAL is controlled to satisfy phase matching condition at an optimal wavelength to minimize chromatic aberration, wherein the optimal wavelength phase matching is used for getting a color image.

23. The three-dimensional camcorder of claim 1, wherein the MMAL is tilted in the imaging system of the camcorder so that the normal direction of the MMAL is different from the optical axis of the imaging system.

24. The three-dimensional camcorder of claim 1, wherein the profile of MMAL is symmetric about an axis which is perpendicular to the optical axis and the tilting axis.

25. The three-dimensional camcorder of claim 1, wherein each micromirror has one translational motion along the normal axis to the plane of each MMAL and two rotational motions about two axes in the plane of each MMAL.

26. The three-dimensional viewfinder of claim 1, wherein the focal length of the variable focal length MMAL is fixed to be used as a two-dimensional viewfinder.

27. The three-dimensional camcorder of claim 1, further comprising a two-dimensional viewfinder displaying the all-in-focus image.

* * * * *